United States Patent [19]

Staar

[11] 4,338,644
[45] Jul. 6, 1982

[54] MAGNETIC TAPE CASSETTES PROVIDED WITH MEMORY CIRCUITS FOR STORING INFORMATION

[75] Inventor: Theophiel C. J. L. Staar, Brussels, Belgium

[73] Assignee: Staar S. A., Belgium

[21] Appl. No.: 87,691

[22] Filed: Oct. 22, 1979

[30] Foreign Application Priority Data

Oct. 27, 1978 [BE] Belgium ................................. 871596
Oct. 31, 1978 [BE] Belgium ................................. 871690

[51] Int. Cl.³ ............................................. G11B 27/24
[52] U.S. Cl. ...................................... 360/132; 360/69; 360/72.2; 360/137
[58] Field of Search ....................... 360/27, 72.2, 72.1, 360/69, 132, 137

[56] References Cited

U.S. PATENT DOCUMENTS 3,630,170 12/1971 Christo .
3,661,394 5/1972 Siller .
3,672,604 6/1972 Beaumont .
3,678,215 7/1972 Kihara .
3,701,860 10/1972 Iwawaki et al. ....................... 360/69
3,705,699 12/1972 Siller .
3,723,666 3/1973 Ferrari .
3,734,052 5/1973 Feldman .
3,839,736 10/1974 Hoshall .
3,911,494 10/1975 Wilson et al.
3,913,200 10/1975 Kossor .
4,210,785 7/1980 Huber et al. ....................... 360/72.2

FOREIGN PATENT DOCUMENTS 2719985 11/1977 Fed. Rep. of Germany ...... 360/132
360725 11/1931 United Kingdom .

Primary Examiner—Glen R. Swann, III
Attorney, Agent, or Firm—Leydig, Voit, Osann, Mayer and Holt

[57] ABSTRACT

Cassettes of recording tape are provided with an electronic memory including semi-conductor circuits mounted in the cassette housing for storing data relating to the cassette or tape therein. A memory error signal device is also provided in the cassette housing having states representing that data stored on the cassette memory has an error or no error. Devices for a tape deck apparatus for cooperation with the cassette memory circuits and error signal device are also disclosed.

32 Claims, 26 Drawing Figures

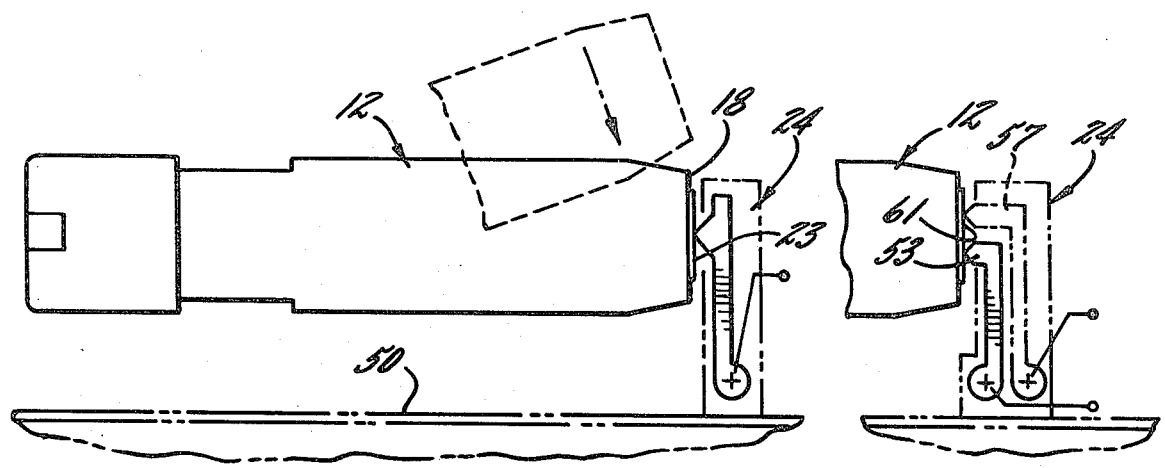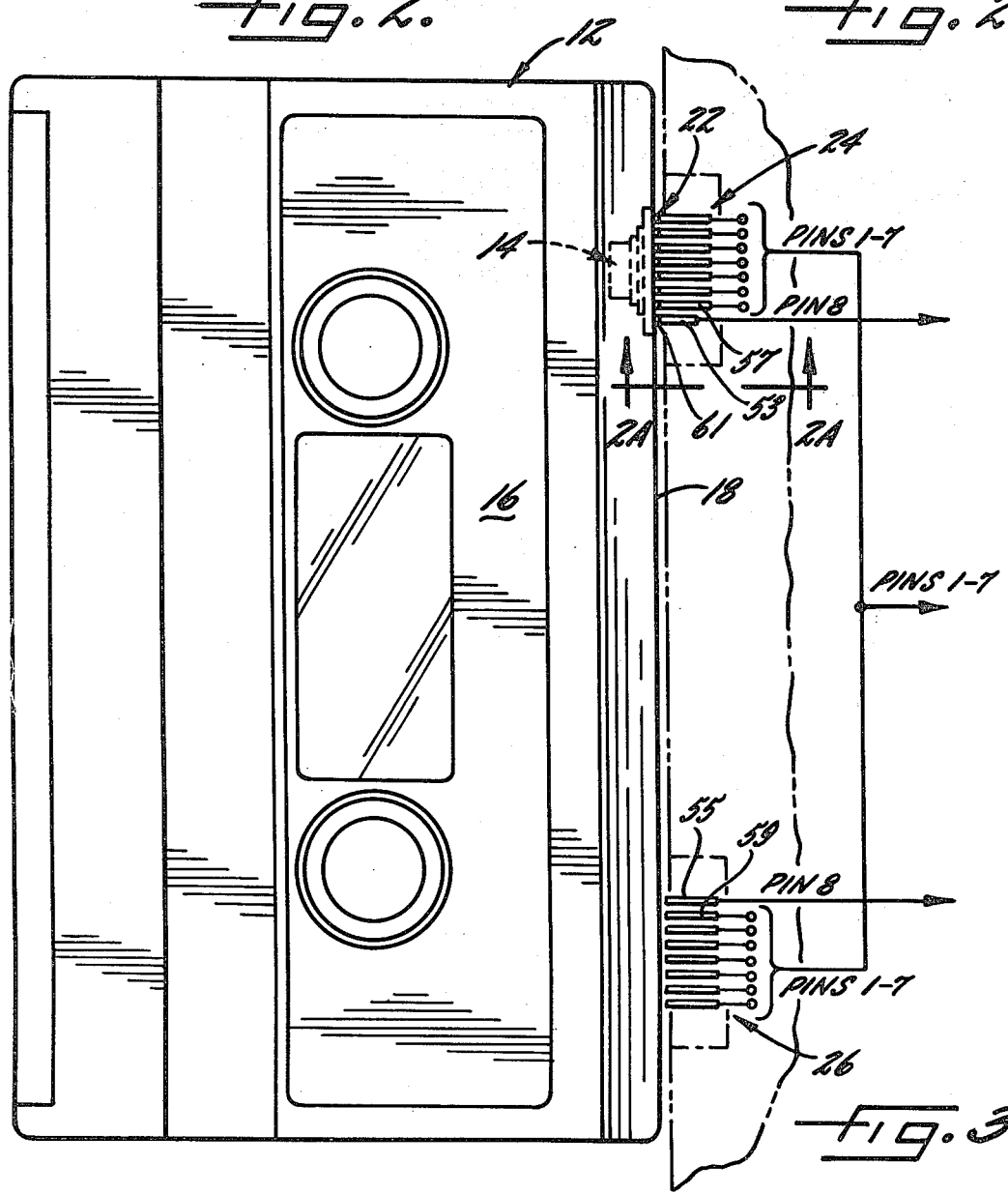

| MEMORY ORGANIZATION ||
|---|---|
| ADDRESS | CONTENT |
| 0 | 125 |
| --- | --- |
| 79 | 3108 |
| 80 | 236 |
| 81 | 3050 |
| 82 | C60 |
| 83 | BIAS |
| 84 | EQUALIZATION |
| --- | --- |
| 99 | |

MAGNETIC TAPE CASSETTES PROVIDED WITH MEMORY CIRCUITS FOR STORING INFORMATION

The present invention relates to the provision in cartridges or cassettes containing magnetic recording tape of memory circuits for storing information relating to the tapes contained in the cartridges or cassettes.

The term "cassettes" when used hereinafter means a container for magnetic recording tape and is used in the broad sense to mean any of the various known types of such containers sometimes referred to as cartridges and having one or two reels for storing the tape within the container.

The principal object of the invention is to provide cassettes with memory circuits for representing by the state of such circuits, information as to the cassettes or tapes contained within the cassettes, the memory circuits being readable from a peripheral device such as a controller for a tape deck. Various kinds of fixed information may be stored such as for identifying the cassette and/or the tape contained therein such as its type (C45, C60, C90, C120, etc.), its length, or its magnetic bias and equalization value, or the titles of the recordings on the tape in the form of an index or listing. A related object is to provide cassettes with memory circuits which accept writing signals that represent information which changes or which the user may desire to change, and which are also readable from a peripheral device, such as the instantaneous position of the tape, the locations of different programs recorded on a video or music tape or data fields recorded on a computer tape.

A related object is to provide tape decks equipped to receive such cassettes, to read the information stored in such memory circuits, to write information in such memory circuits such as continuously updating tape position as the tape deck operates to reproduce or record information on the tape in the cassettes, and to display the information read from the cassette memory circuits or use it for controlling the operation of the tape decks.

BACKGROUND OF THE INVENTION

A disadvantage of conventional cassettes is that the user can only estimate the position of the magnetic tape in relation to one of its ends, when a cassette is reintroduced by the user in a tape deck. Conventional cassettes are provided with transparent windows permitting direct observation of the thickness of the winding of the magnetic tape on one or the other of the reels; however this method of estimating position is completely lacking in precision because of the extreme thinness of the tape.

It has also been proposed, in order to improve the precision of mechanisms for indicating tape position to fit mechanical movement indicators in or on the cassettes, but their complexity and bulkiness is such that practically no cassette can contain them. Moreover, as their precision remains unacceptable and their selling price is very high, while these mechanical indicators have been proposed in prior art patents they have found little if any commercial use.

SUMMARY OF THE INVENTION

Accordingly, one of the principle objects of this invention is to overcome this disadvantage of conventional cassettes, by providing tape decks with means for deriving information such as tape position and for writing such information in memory circuits carried by the cassettes, in order to store such information in a form that permits it to be updated as the tape is driven so that the tape position information stored in the memory circuits is accurate after the cassette is removed from the tape deck. Thus when the cassette is reintroduced into the tape deck, information as to instantaneous tape position may be read from the memory units carried by the cassettes. To carry out this objective, the system of the invention provides a tape deck apparatus having a detector of the movement of the magnetic tape which delivers signals representative of said movement of the tape, and further includes an electronic memory circuit in the form of an electrically alterable ROM which is mounted on the cassette so that it may be removed and reintroduced relative to the tape deck as the cassette is removed and reintroduced.

Further in carrying out the invention electric terminals are provided on the tape deck to contact terminals of the memory circuits carried by cassettes in order to connect the circuits of the tape deck for writing information into the memory and reading information from the memory when the cassette is in its operative position in the tape deck.

Another object is to provide mechanism for cassettes which insures that in the instance where a cassette having electronic memory circuits is operated in a tape deck which contains no means for updating the information in the memory circuits representing instantaneous tape position, the memory of tape position will be erased to eliminate the erroneous information concerning tape position. A related object is to provide a tape deck having a memory error signal mechanism which flags when a cassette having memory circuits according to the invention has been introduced into a tape deck not designed for such a cassette.

Other features and advantages of the invention will become evident from the embodiments described in the following drawings, wherein:

BRIEF DESCRIPTION OF THE DRAWING

FIG. 2 is a fragmentary elevational view of a portion of the tape deck apparatus shown in FIG. 1 to illustrate the terminals on the tape deck apparatus interconnected with terminals on a cassette having electronic memory means;

FIG. 2A is a fragmentary section taken along the line 2A—2A in FIG. 3, of the tape deck apparatus illustrating specific details of certain terminal connections;

FIG. 3 is a plan view similar to FIG. 1 of a cassette having electronic memory means and illustrating the connections to terminals of a tape deck apparatus;

DESCRIPTION OF THE PREFERRED EMBODIMENTS

Cassette With Memory

Figures 1, 1A:
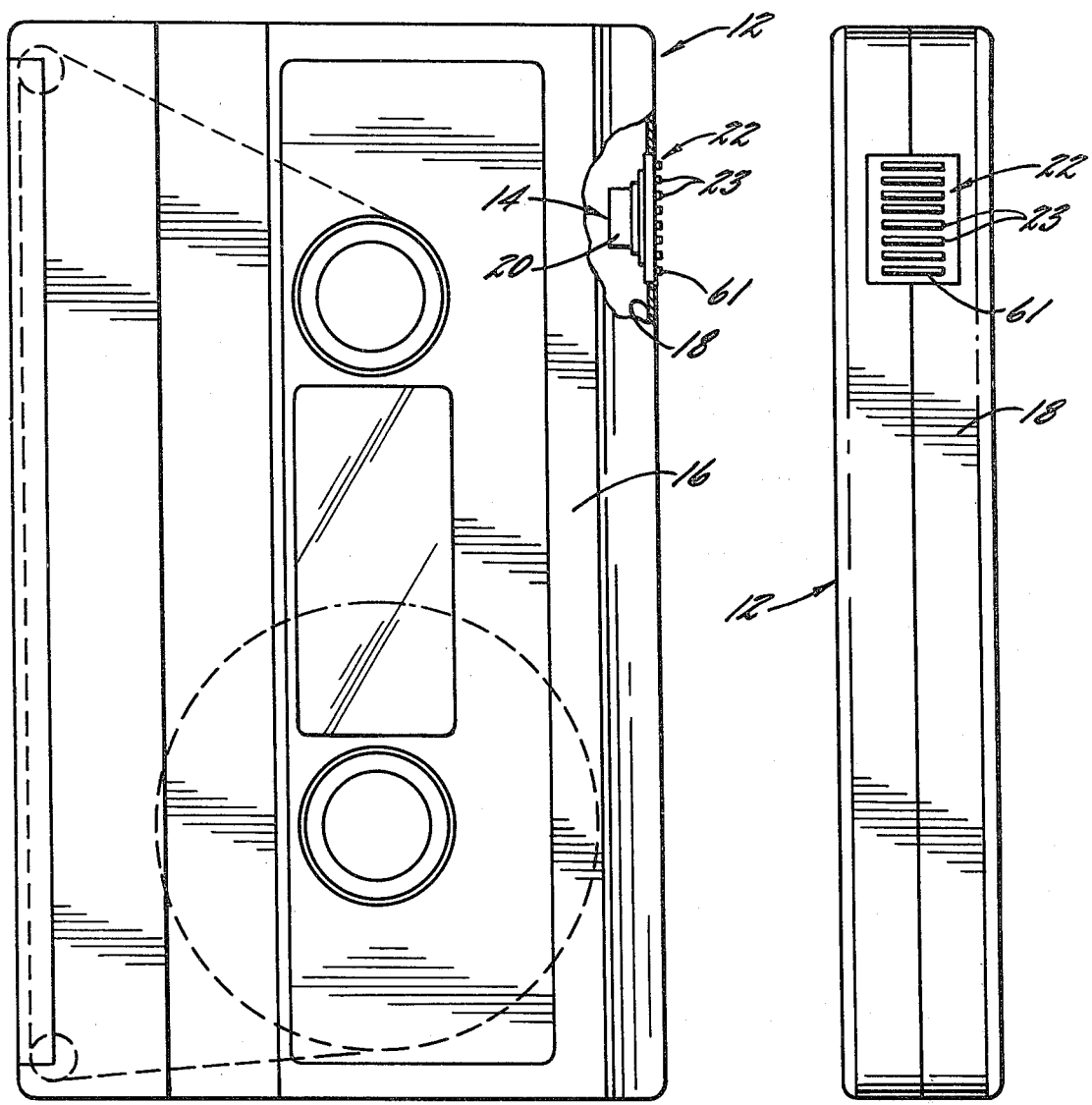
FIG. 1 is a plan view with portions broken away of a cassette having electronic memory means carried by the cassette housing, constructed in accordance with the invention.
FIG. 1a is an end view of the cassette shown in FIG. 1.

Turning now to the drawings, FIGS. 1 and 1A illustrate a cassette 12 of magnetic recording tape constructed according to the invention with an electronic memory means 14 carried by the housing 16 of the cassette for storing signals representing data as to the cassette or tape contained therein. As herein shown, the electronic memory means is preferably an electrically alterable ROM (i.e. EAROM) provided by a semi-conductor integrated circuit illustratively of the model ER1400 which is available from different manufacturers including General Instrument. On the rear edge 18 of the cassette housing 16 the packaged memory circuits 20 are carried inside the housing and means are provided on the outside of the housing serving as memory terminals 22 adapted to engage and make electrical connection to terminals 24 of a peripheral device (FIG. 3). In the present case, a printed circuit provides a set of conductive bars 23 which provide the terminals 22 to the memory circuits. An ER1400 electrically alterable ROM is available packaged with eight external pins, and as herein shown, is mounted directly to the printed circuit providing the set of terminals 22 on the outside of the cassette housing. While the location of the memory means on the housing of the cassette may be varied as desired, it is preferred as shown in FIGS. 1 and 1A to mount the memory means assymmetrically and to provide as shown in FIG. 3 two sets of terminals 24, 26 on the peripheral device. With this arrangement, of two sets of terminals 24, 26 in a tape deck apparatus, the particular set of such terminals which is engaged by the memory means terminals 22, indicates the operative side of the cassette, side 1 or 2, in the tape deck apparatus.

Tape Deck Apparatus

Figure 1B:
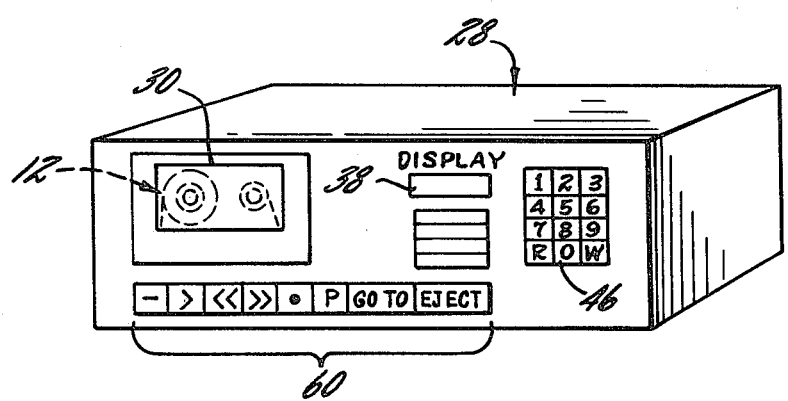
FIG. 1b is a perspective view of a tape deck apparatus for cassettes as shown in FIG. 1.

A tape deck apparatus 28 is shown in FIG. 1B, which is well suited to receive cassettes constructed according to the invention, this type of tape deck apparatus having a vertical pivotable holder 30 which when pivoted to its closed operative position as shown in FIG. 1B, causes the tape and reel drive elements of the tape deck apparatus to engage with the tape and reel hubs of a cassette loaded in the holder 30. Moreover, as the holder 30 is pivoted to its closed position, fixed terminals 24, 26 mounted on the tape deck apparatus as shown in FIG. 3 are engaged by the terminals 22 on the cassette 12 as the cassette is moved essentially edgewise into its operative position, as indicated in FIG. 2 by the arrow.

Figure 4:
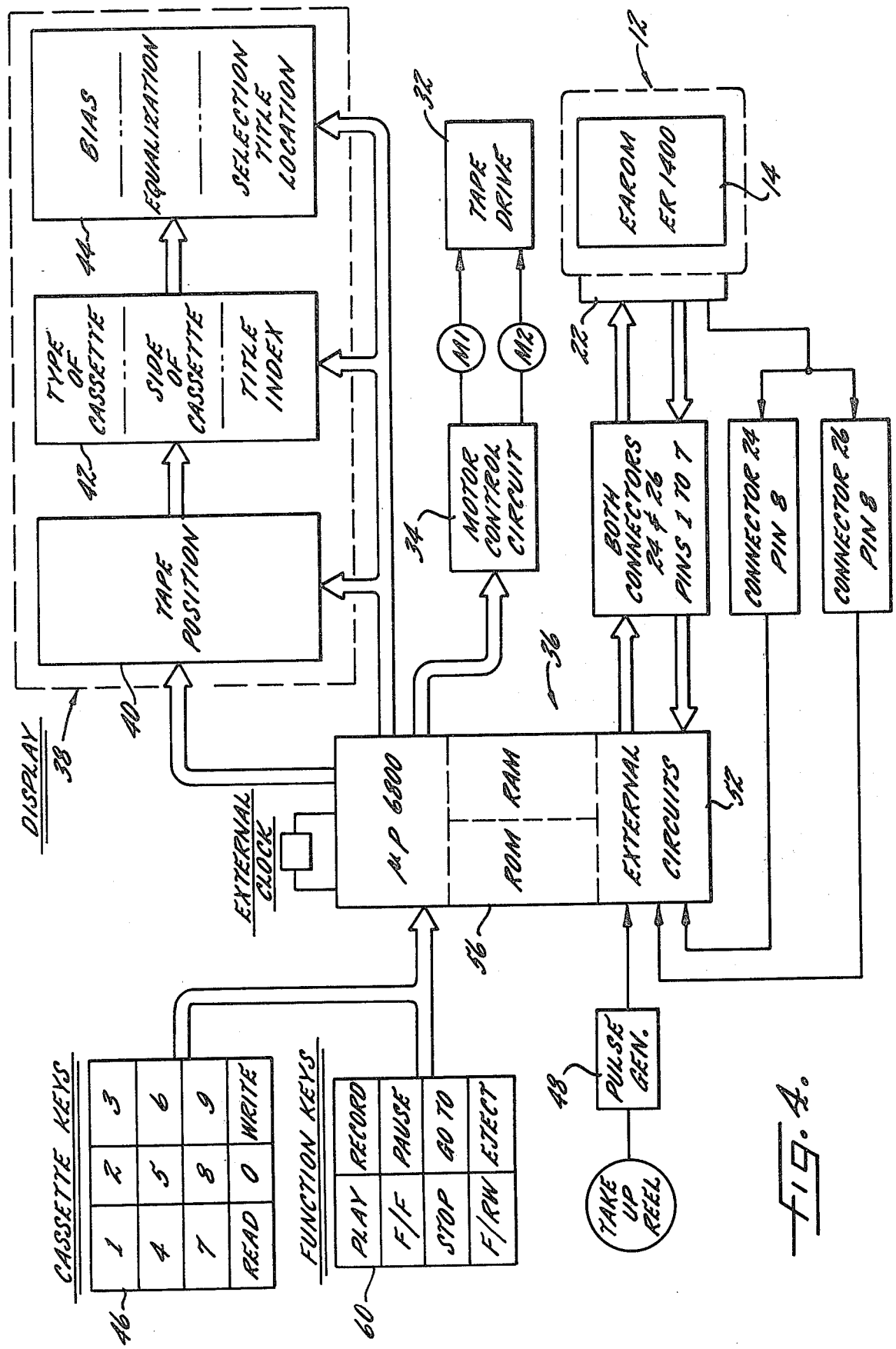
FIG. 4 is a schematic view of circuits included in the tape deck apparatus illustrating a microprocessor based controller means and connections to an electronic memory means of a cassette.

As indicated schematically in FIG. 4, in accordance with the invention tape deck apparatus for receiving cassettes with electronic memory means as shown in FIG. 1, includes a tape and reel drive 32 and motors M1 and M2 for operating the drive 32 which in turn are controlled by a motor control circuit 34 connected to a controller 36 herein shown as a microprocessor based control means. The drive 32 for the tape conventionally includes capstans for transporting the tape from reel to reel and reel drive spindles for rotating the reels for taking up the tape on the take-up reel and releasing it from the supply reel.

The tape deck apparatus includes, in addition to the controller means, display means 38 connected to the controller means and operated thereby. Display means 38 is provided for displaying different types of information or data relating to the cassettes or the tapes in the cassettes. As shown in FIG. 4, the display means 38 may have different sections 40, 42, 44 for different types of information such as, for example, instantaneous tape position, type of cassette (i.e. C-60, C-90, C-20) and bias and equalization settings for the tape contained in the cassette. Such information to be displayed is obtained from the memory means 14 of a cassette 12 received in the tape deck or, as in the case of tape position, derived by the controller means 36 as the tape is driven and recorded in the memory means of a cassette before a cassette is removed.

Other types of information or data may be displayed such as titles and/or locations of selections on a video or music tape, locations of programs on a computer tape, or an index of titles. Such information or data may be obtained either from memory means of a cassette, having been stored therein, or may be stored therein by the user utilizing the controller means circuits for producing write signals for writing data into the memory means of a cassette, a manually operable keyboard 46 being shown as one illustrative means for the user to input the information or data desired to be stored such as locations of selections on a tape.

With regard to systems for determining instantaneous tape position, in its simplest form the controller means 36 of FIG. 4 is operative under program control to display tape position in terms of take-up reel revolutions from one end of the tape, which is achieved by counting the pulses coming from a pulse generator 48 connected to the take-up reel and dividing by a constant (i.e. 16 pulses) representing the number of pulses produced by the pulse generator per revolution of the take-up reel.

There are more complex systems that may be used for determining tape position if desired, such as determining linear position of the tape by comparing the relative velocities of the take-up reel and supply reel as described and shown in U.S. Pat. No. 4,172,231 and application Ser. No. 953,211 filed Oct. 20, 1978. When linear position of the tape is determined, such position may be displayed in terms of distance or time to the end of the tape.

In order to connect the memory means 14 of a cassette 12 to the electronic components of a peripheral device such as tape deck apparatus 28 as an incident to introduction of the cassette into the apparatus, the two sets of terminals 24, 26 which are included on the frame 50 of the tape deck apparatus are located to engage the terminals 22 on the cassette as the cassette is pivoted into loaded position as shown in FIG. 2. A pair of connector terminals 24, 26 are provided on the frame 50 so that one or the other will be engaged by the assymetrically mounted arrangement of conductive bars 23 serving as the memory terminals outside the cassette housing 16 on its rear edge 18.

Interface Circuit

Figures 4A, 4B:
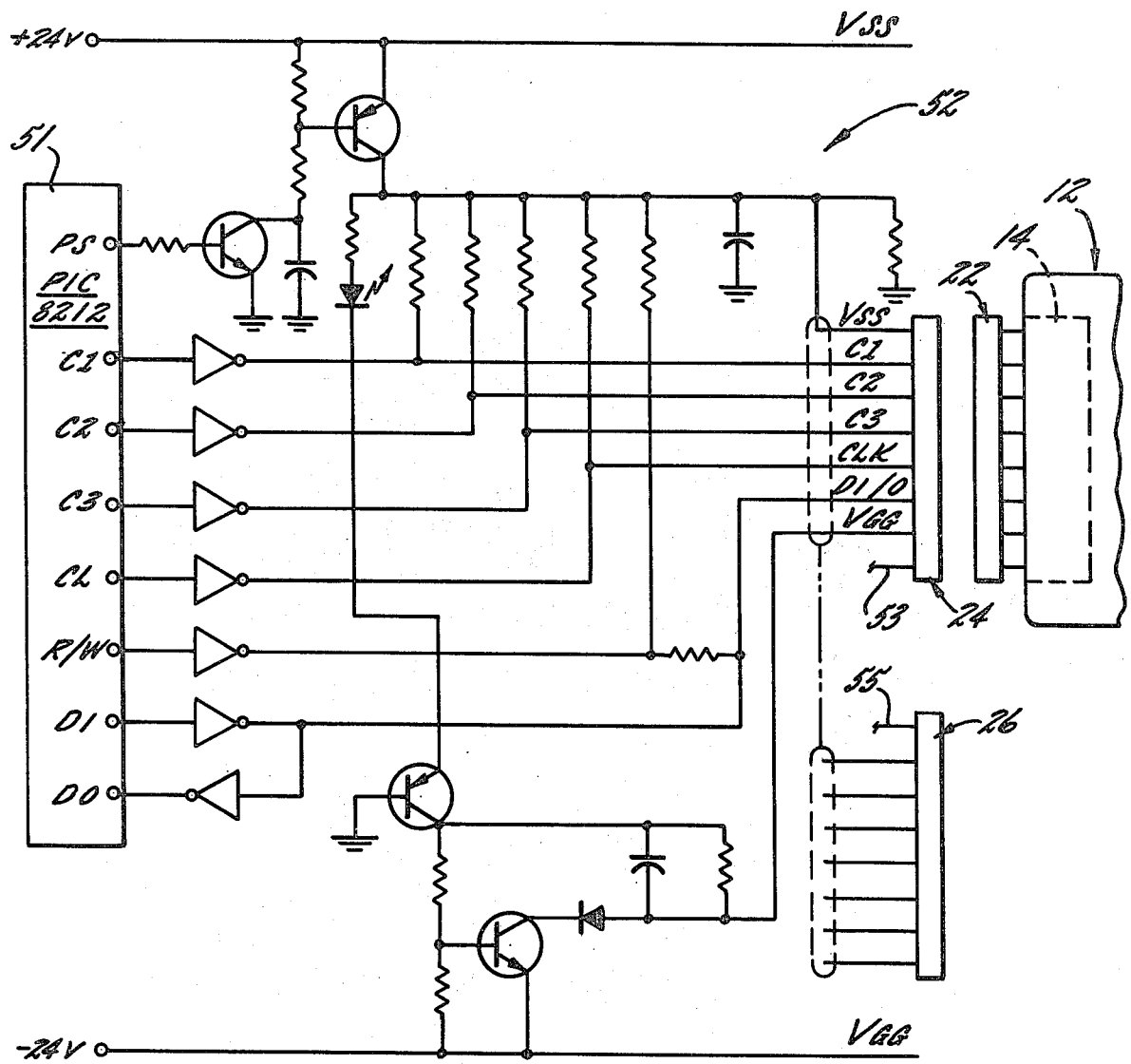
FIG. 4A is a diagrammatic view of an interface circuit required for driving the memory means of the cassette shown in FIG. 1.
FIG. 4B is a table illustrating the memory organization of the memory circuits of the memory means of a cassette as shown in FIG. 1.
Figure 5:
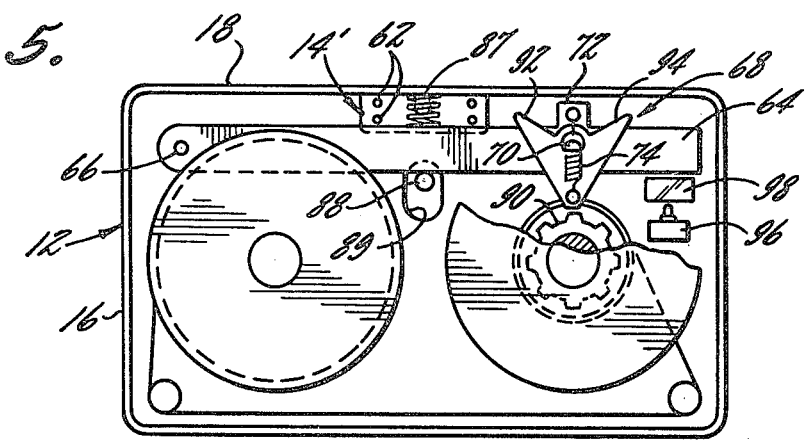
FIG. 5 is a plan view of a cassette having electronic memory means and mechanism to generate signals warning the user after a cassette with memory is operated in tape deck apparatus not adapted for such a cassette.

In the preferred form of the invention, the memory circuits 20 which are provided by an ER1400 semi-conductor chip, are interfaced with the controller means 36 of the tape deck apparatus by an interface circuit schematically illustrated in FIG. 4A. The controller means 36 includes a microprocessor 56 operative under program control both to communicate with the cassette memory 14, operate the displays 38, and control the tape deck drive 32 and other functions of the tape deck apparatus. A Motorola 6800 microprocessor is preferred for the controller means, but other microprocessors or other types of controller means may be used, as desired.

With a controller means 36 as shown, the circuit 52 of FIG. 4A is connected from a peripheral interface adapter circuit 8212 51 which is an external circuit 40 connected to the 6800 microprocessor to interface with the ER1400 ROM of the cassette memory means, and is included generally in FIG. 4 in the external circuits to the microprocessor. As shown in FIG. 4A a standard ER1400 ROM circuit has seven pins (Vss, C1, C2, C3, CLK, DI/0, Vgg) for connecting power to the EAROM and operating its circuits. By providing the terminal connectors 24, 26 of the tape deck apparatus with a set of eight pins each, where only seven pins are required for connection to the memory circuits, the eighth pin of each terminal connector on the frame is available as a simple means to identify which side of a flippable cassette is in operative, (play, record,) position. Thus as shown in FIGS. 3 and 4A, the pins 1-7 of both terminal connectors 24, 26 are wired in parallel, and (FIG. 4) the eighth pin (53 or 55) of each terminal connector 24, 26 is individually wired to the external circuits of the microprocessor for signalling the operative side of a cassette loaded in the apparatus. As a simple and reliable means for providing a signal from one or the other of the two connector terminals 24, 26 on the frame 50, indicating which side of a flippable cassette is in operative position, as shown in FIG. 3, the eighth pin 53 or 55 of each of the frame mounted connector terminals 24, 26 is arranged adjacent one of the other pins 57 or 59 carrying supply voltage, and contacts a common conductive bar 61 (FIG. 1A) of the cassette terminal 22, so that this voltage is sensed by the eighth pin of whichever frame terminal 24 or 26 is engaged by the terminal 22 on the cassette to produce a signal representing that side 1 or side 2 of the cassette is operative.

Controller Means

Referring again to FIG. 4, the controller means 36 is there shown to include the microprocessor 56 and associated ROM, RAM and external circuits to interface the microprocessor and its memories to the various devices to which they are connected. In addition to the display means 38 and the memory means 14 of a cassette 12 loaded in the tape deck apparatus, the controller means 36 is connected to a keyboard 46 for manual input of data, herein shown as numerical data, although a keyboard for input of other types of data may be included as desired. The keyboard 46 also includes "read" and "write" control keys for designating such operations to be carried out by the controller means 36 with relation to the memory means of the cassette. By use of the keys in cooperation with the microprocessor under program control, tape position locations of different selections recorded on the magnetic tape of a cassette may be keyed in manually and in selected locations in memory. Such locations may then be read and shown on the display by operation of the "read" key.

A manual control panel 60 is provided for operation of the tape deck apparatus to carry out its various (play, record etc.) functions, the functions being controlled by the controller 36 means which is connected for this purpose to the motor control circuits for the drive motors M1 and M2. The motors are connected to the tape and reel drive mechanism which is operable to transport the tape from reel to reel of a cassette at normal, intermediate and fast speeds.

Cassette Memory Circuits and Operation

As previously indicated, in accordance with the invention, the cassette memory is provided by semi-conductor memory circuits, herein shown as an ER1400 electrically alterable ROM. The ER1400 is a standard device consisting of a memory array, control circuitry, 20-bit serial to parallel shift register for addressing, and a 14-bit serial to parallel, parallel to serial shift register for data input and output. The ER1400 has the memory circuits organized as 100×14-bit words, as indicated in FIG. 4B. The device is electrically eraseable and non-volatile memory in which individual words may be erased and restored. Once written, a word will retain its data for a minimum of ten years. The foregoing information is provided in bulletin 1207 of General Instruments Corporation and application notes for the ER1400 EAROM.

As indicated in that bulletin, data is transferred to or from the ER1400 by first serially inputting 20-bit address words and then serially shifting in or out the 14-bit data word. Control of these operations is done by three control lines (C-1, C-2 and C-3) and a 14 KHZ timing reference.

As also indicated in that bulletin the functions of the pins of the EAROM 20 are as follows:

| PIN NAME | FUNCTION |
|---|---|
| Data DI/0 | In the Accept Address and Accept Data modes, this pin is an input pin for address and data respectively. In the Shift Data Out mode this pin is an |

-continued

| PIN NAME | FUNCTION |
|---|---|
| | output pin designed to drive MOS. In Standby, Read, Erase and Write, this pin is left floating. |
| Vss | Chip substrate. Normally connected to ground or + volt supply. |
| Vgg | DC supply. Normally connected to − volt supply. |
| Clock | 14kHz timing reference. Required for all operations. |
| C1, C2, C3 | Mode control pins. Their operation is as follows: |

| C1 | C2 | C3 | Function |
|---|---|---|---|
| 0 | 0 | 0 | Standby - contents of Address and Data Register remains unchanged. Output buffer is left floating. |
| 0 | 1 | 1 | Accept Address - Data presented at the I/0 pin is shifted into the Address Register with each clock pulse. Addressing is by two consecutive one-of-ten-codes. |
| 1 | 0 | 0 | Read - The address word is read from memory into the data register. |
| 1 | 0 | 1 | Shift Data Out - The output driver is enabled and the contents of the Data Register are shifted out one bit with each clock pulse. |
| 0 | 1 | 0 | Erase - The word stored at the addressed location is erased to all zeros. |
| 1 | 1 | 1 | Accept Data - The data register accepts serial data presented at the I/0 pin. The Address Register remains unchanged. |
| 1 | 1 | 0 | Write - The word contained in the Data Register is written into the location designated by the Address Register. |

The microprocessor is programmed to drive the ER1400 EAROM, and several illustrative programs are flow diagrammed in FIGS. 16–19, such programs including sub-routines for operating the ER1400 ROM designated for convenience S/R1: address in, known as "address in"
S/R2: data in plus erase, known as "data in"
S/R3: data out, known as "date out".

The timing diagrams for the portions of the sub-routines are provided in the technical specifications provided by the manufacturer for the ER1400 EAROM and are readily available and not repeated herein.

FIG. 4B illustrates diagrammatically the exemplary memory organization according to the invention which may be provided by ER1400 ROM, which is organized as 100 words of 14-bits each. Thus, as shown in FIG. 4B, an exemplary memory organization includes 80 locations at address 0 through 79, these memory locations being addressable by manual operation of the microprocessor to write in selected tape positions at any one of the 80 locations.

Location address 80 may be utilized for storing the instantaneous tape position for side 1 of the cassette tape by the microprocessor under control of a program, and similarly location 81 may be utilized for storing the instanteous tape position for side 2.

When a flippable cassette is used, both instantaneous tape positions (side 1, side 2) are updated as soon as the tape is driven, the tape positions for both sides being complementary.

Since the ER1400 ROM has limited memory, the data which may be stored therein is necessarily confined within constraints imposed by that particular memory circuit, however it should be understood that by expanding the capacity of the memory on the chip, storage may be provided for various types of information in addition to those discussed herein. Within the capacity of the ER1400 ROM, memory space is available for storing digital values representing the type of cassette (i.e. C-60, C-90, C-20) at, for example, location address 82. At location address 83, the bias setting for the cassette tape may be stored and at location address 84 the equalization setting for the tape may be stored, these data being constants for the cassette or tape contained therein and stored in the memory by the manufacturer. Other constants representing the cassette or tape may be stored in the remaining memory locations, as for example, constants utilized in the determination of tape position in a system constructed as described in the U.S. Pat. No. 4,172,231 and copending application Ser. No. 953,211 referred to hereinabove.

Controller Means Operation

In its preferred form, the controller means 36 for the tape deck apparatus comprises a Motorola 6800 microprocessor 56 operative under program control to carry out the required control functions and to communicate with the memory means 14 of a cassette 12 loaded in the apparatus. Such a microprocessor includes a CPU, external ROM, RAM memories, and a time-basis circuit driven by a 4 MHZ crystal and delivering 2 MHZ signals. While the system described herein as a preferred form of the invention includes the circuit of FIG. 4B for interfacing such a 6800 microprocessor to an ER 1400 EAROM for cassette memory, it is contemplated that other semi-conductor integrated circuits compatable with each other and forming an equivalent system may be employed to carry out the invention.

The keyboard 46 provides means for the user to select an address in the cassette memory by depressing keys corresponding to the address number and either to read the content of said address by depressing the "read" control key or to memorize the tape position displayed by the display at said address by depressing the "write" memory control key.

The control panel also includes function keys 60 which enable the user to operate the tape deck apparatus and manually direct the controller means 36 with regard to the tape deck apparatus functions such as directing the tape travel direction as well as eject, pause or stop.

The controller means 36 drives the display means 38 over its output lines for displaying tape position and other types of data with regard to the tape or cassette such as the type of cassette used, the bias equalization constants, and the side of the cassette which is operative (side 1 or 2).

Lights operated by the controller means may also be provided for indicating the functions being carried out by apparatus, such as play, record, pause, etc.

When a cassette is loaded in the tape deck apparatus, its memory terminals 22 are engaged either to the right connector terminal 24 or to the left connector terminal 26 on the tape deck apparatus frame 50. As previously noted, the eighth pin (53 or 55) of both connector terminals on the frame will be energized from the power supply and a signal thus carried to the controller means representing the operative side (side 1 or side 2) of the cassette loaded in the apparatus.

Figure 16:
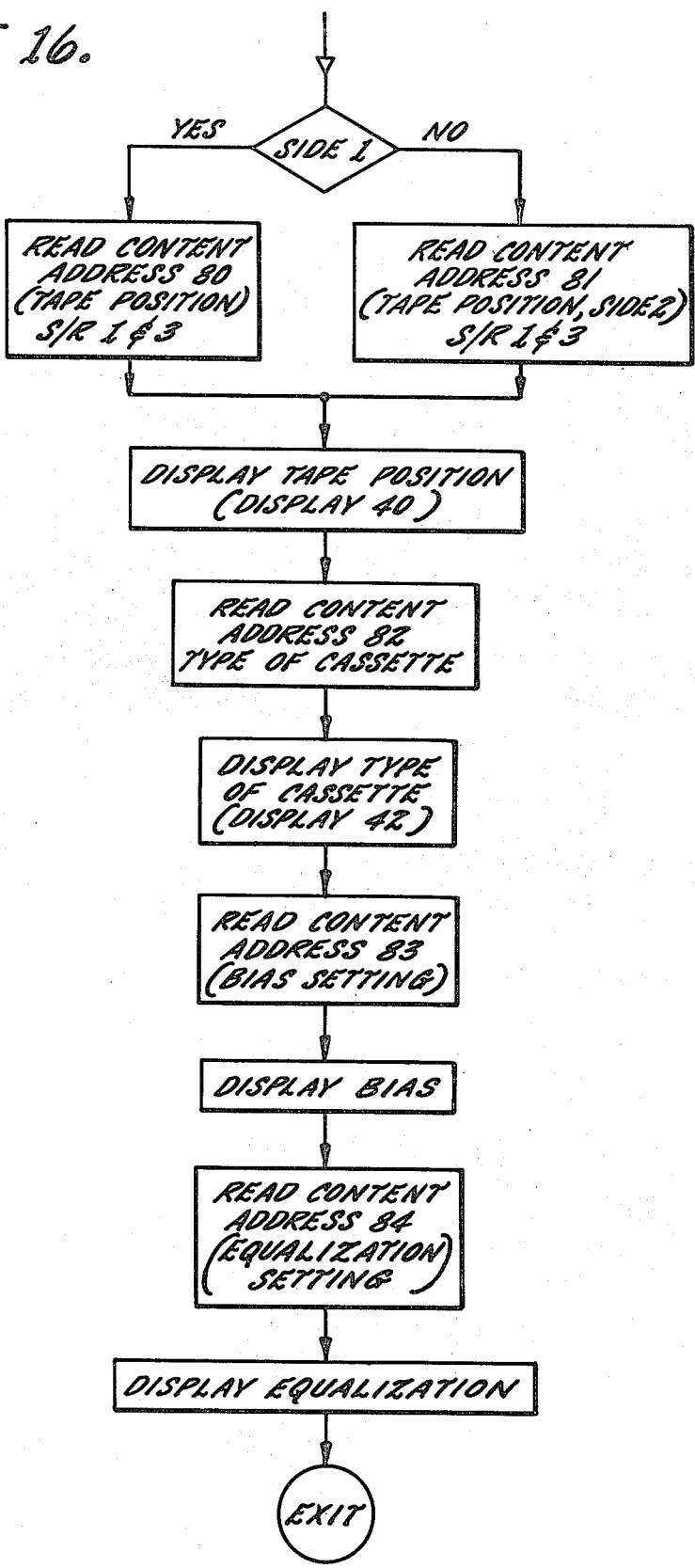
FIGS. 16, 17, 18 and 19 are flow diagrams of programs for the microprocessor based controller means illustrated in FIG. 4, and operative to control said controller means to write data to and read data from the electronic memory means of a cassette constructed according to the invention.
Figure 17:
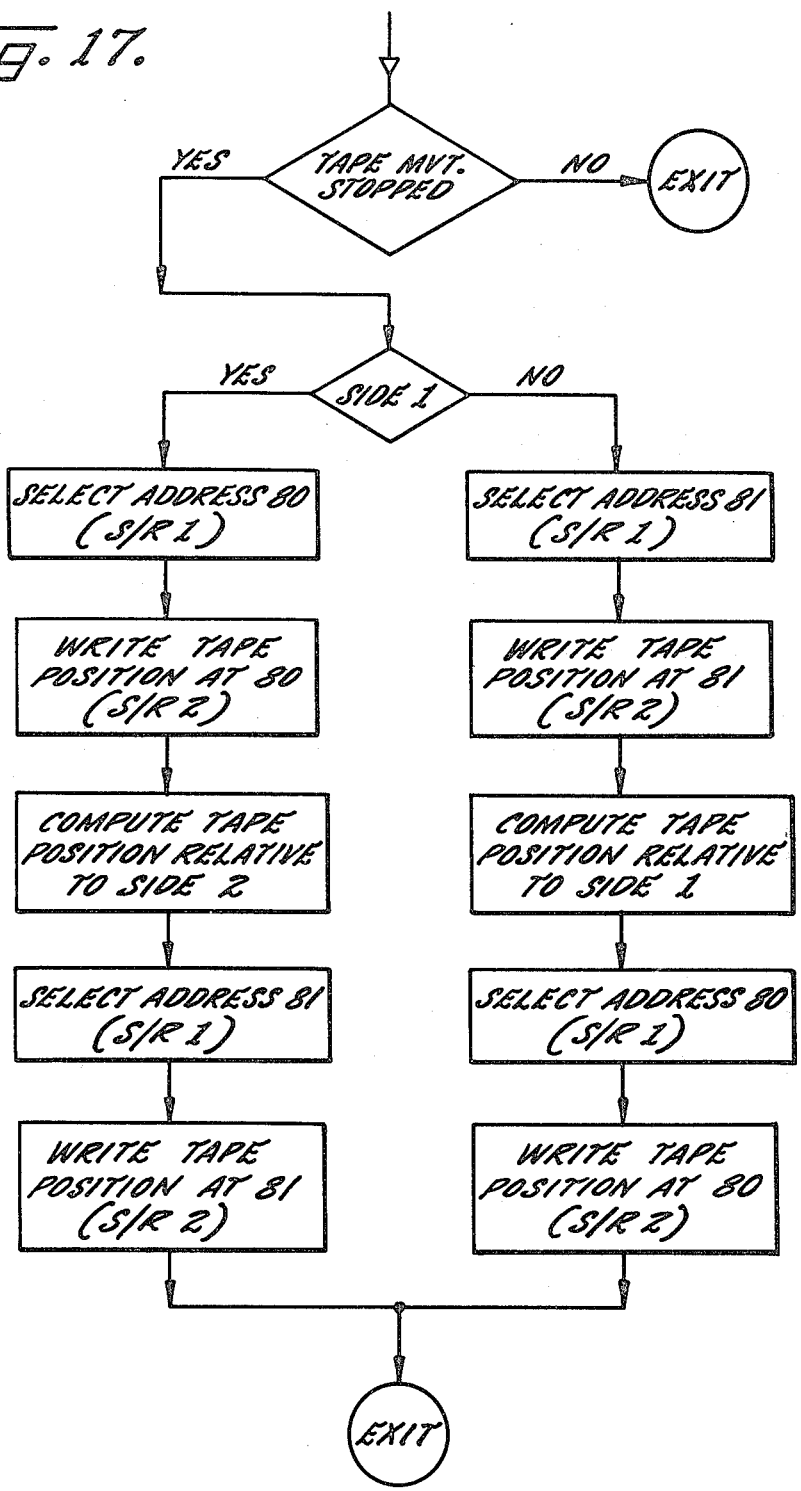

Referring to the flow diagram shown in FIG. 16, this indicates the operation of the microprocessor under program control after the system has been activated and a signal is received by the controller means representing that either side 1 or side 2 is in operative position in the cassette loaded in the apparatus. As indicated in FIG.

16, in the program steps the first question is "side 1 in operative position?". If "yes" the left hand branch of the flow diagram is followed and the microprocessor operates to read the content of address 80 in the cassette memory and executes the subroutine S/R1 plus S/R3, namely "address in" and "data out". Receiving the data from the memory, the processor then displays tape position on the displaying segment 38.

The next step of the program is to read the content of address 82 in the memory, using the same subroutines S/R1 plus S/R3 in order to read data as to the type of cassette (C-60, C-90 etc.) and in the next step of the program to display on the display section 42 the type of cassette. The next step is to read the content of address 83 in cassette memory to display the bias setting and thereafter to read the content of address 84, for displaying the equalization setting. The program indicating FIG. 16 then exits, however it will be appreciated that other program steps may be followed in sequence to read and display the contents of other address locations for the types of data stored in the cassette memory, such as titles of the cassette or the like.

One of the features of the invention is that the system provides for display of instantaneous tape position which may have been stored in cassette memory during a prior use of a cassette in the apparatus. Thus the cassette may have been stopped anywhere intermediate the ends of the tape, and the instantaneous tape position previously stored in the cassette will be read from memory when the cassette is reintroduced into the tape deck apparatus. If after the tape has been introduced a function key 60 is depressed (play, fast forward, fast rewind, record) the microprocessor, according to the tape travel direction, will either increment or decrement the tape position display unit by unit as pulses are delivered from the pulse generating means 48 in response to rotation of the take-up reel. As the tape position is continuously updated to provide on the display the instantaneous tape position, in the present instance where the pulse generating means 48 is preferably producing 16 pulses per revolution of the reel, the accuracy will be within 1/16 of a reel revolution. The storage in the cassette memory 14 of instantaneous tape position is carried out under program control by the microprocessor, the flow diagram therefore being illustrated in FIG. 17. Thus, in each program cycle the question is asked "tape movement stopped?", if the answer is "yes" representing the discontinuance of tape drive, the question then is asked is "side 1 of the cassette in operative position?", and if the answer is "yes", the subroutine S/R1 for selecting address 80 is executed and thereafter the tape position is written at that address by following subroutine S/R2. If side 2 of the cassette is in operative position, address 81 is selected and the tape position as written at address 81 is indicated in the flow diagram. Then, in case a flippable cassette is used, the instantaneous tape position relative to the side which is not operative is adjusted by the controller means and the content of the corresponding memory location (81 or 81) is updated accordingly.

Thus it will be appreciated that while the display is continuously updated to reflect instantaneous tape position, the memory means is altered by having the instantaneous tape position stored in both addresses 80 and 81, when tape movement is stopped. In this mode of operation, the instantaneous tape position is always placed in memory before the cassette is removed or the power supply switched off.

As previously indicated, the keyboard 46 includes two control keys including the "read" key and "write" key which allow the user to write data in and read data from the cassette memory means. The keys labeled "0" to "9" allow the user to select an address (0 to 79) providing 80 addresses for user selected information in the memory means of the cassette.

Figure 18:
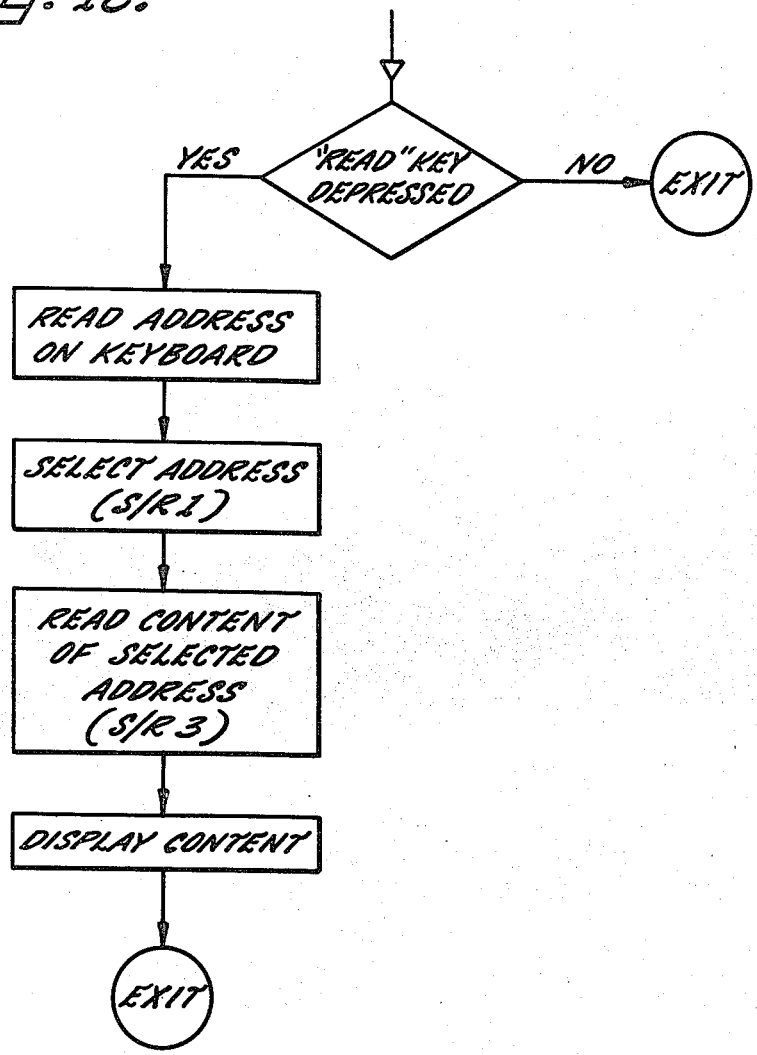

In a similar way, the microprocessor 56 is operative under program control to read data stored in cassette memories and display the data on the display means, following the program steps diagrammed in FIG. 18. Thus the question is asked "read key depressed?". If the answer is "yes", the address is read from the keyboard, the subroutine S/R1 "address in" is followed, the subroutine S/R3 is then executed to read the content of the selected address and the data stored in the selected address is also displayed.

Figure 19:
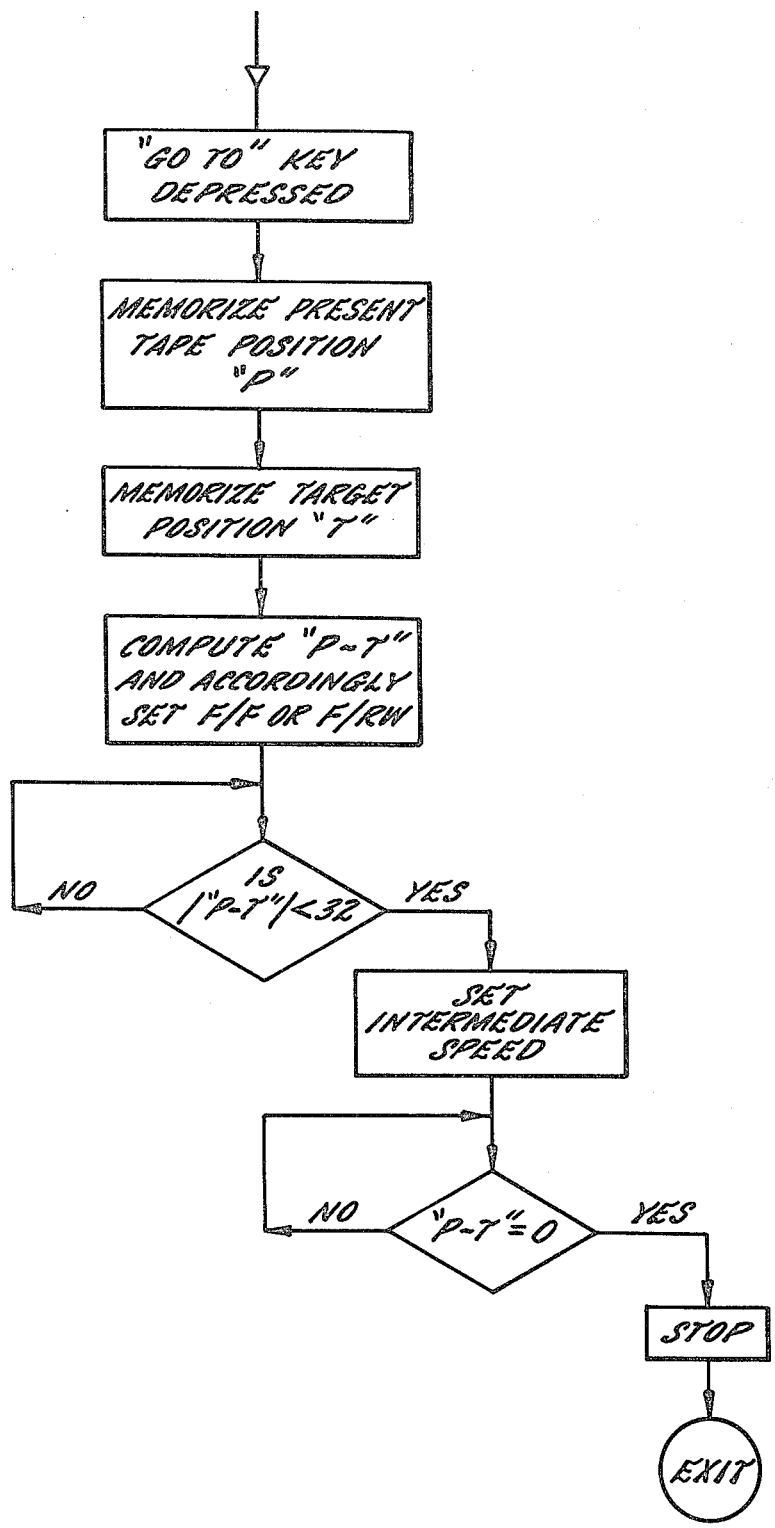

As a further feature of the invention, the controller means microprocessor is operated under control of a series of steps as illustrated in FIG. 19, for example, to drive the tape transport to locate the tape at a selected tape position stored in the cassette memory. Referring to FIG. 19, during a loop of the overall cycle when the "go to" key is depressed, the present tape position "P" is compared with the target position "T" and the difference "P-T" computed and the machine set in fast forward or fast rewind to move the tape in the direction of the target position. The program loops until a "yes" to the question "is P-T=0" at which the tape drive is stopped as indicated in the program sequence diagrammed in FIG. 19.

Such a system provides a simple and convenient means for driving the tape to a target position after it has been introduced into the tape deck apparatus simply by operating the "go to" key after accessing a memory location storing the target tape position. The keyboard also allows the user to move the tape accurately to any position selected through the keyboard. The target position is set in this mode, by operating the keys of the keyboard and powered by the "go to" key. The sequence of programmed operations is set forth in FIG. 19.

Automatic Warning of Memory Error

Turning now to FIGS. 5-15, in keeping with a further aspect of the invention, cassettes 12 with electronic memory means are also provided with a mechanism to warn the user of error in tape position data stored in memory after a cassette has been operated in an apparatus not adapted for cassettes with memory means. Such operation without updating the tape position data stored in memory, of course, renders it obsolete and incorrect.

In order to illustrate this aspect of the invention two different types of cassettes are shown in the drawings, one being a conventional two reel cassette for magnetic recording tape, and the other being a conventional video cassette.

Turning first to FIGS. 5-9 which illustrate the conventional cassette (i.e. C-60, C-90 etc.), in this instance for purpose of illustration the memory means 14' is located not assymetrically as in FIGS. 1-3 but rather in the center of the rear edge 18 of the cassette, and in this instance the memory means 14' is provided with sockets 62 for receiving pins of terminals on the frame which then project internally of the memory means package for connection to the memory circuits 20. This arrangement of internal socket-type terminals 62 on the memory means 14' is an alternative terminal construction to the arrangement of exposed terminals 22 shown in FIGS. 1-3.

In accordance with the invention, a memory error signal device is carried by the cassette housing 16 for generating a warning signal upon operation of the cassette reels, the device providing either or both a visual signal and an electrical signal representing that data stored in cassette memory may be in error. In the present case, the device comprises a lever 64 which is arranged substantially parallel with the rear edge 18 of the cassette housing 16 and pivatally supported on a pin 66 supported by the cassette housing. On the lever 64 is mounted a pawl 68 which is V-shaped and pivotal about the shaft 70. Moreover, on the lever 64, near the pawl 68, a projection 72 is provided to which is fixed a spring 74 which is connected at its other end to a projection 76 on the pawl 68 in the vicinity of its apex.

Figure 9:
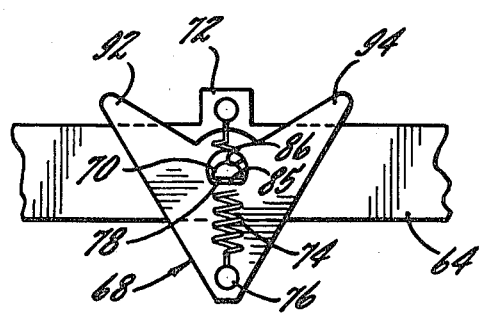
FIG. 9 is a fragmentary detailed view of a portion of the mechanism shown in FIG. 5.
Figure 10:
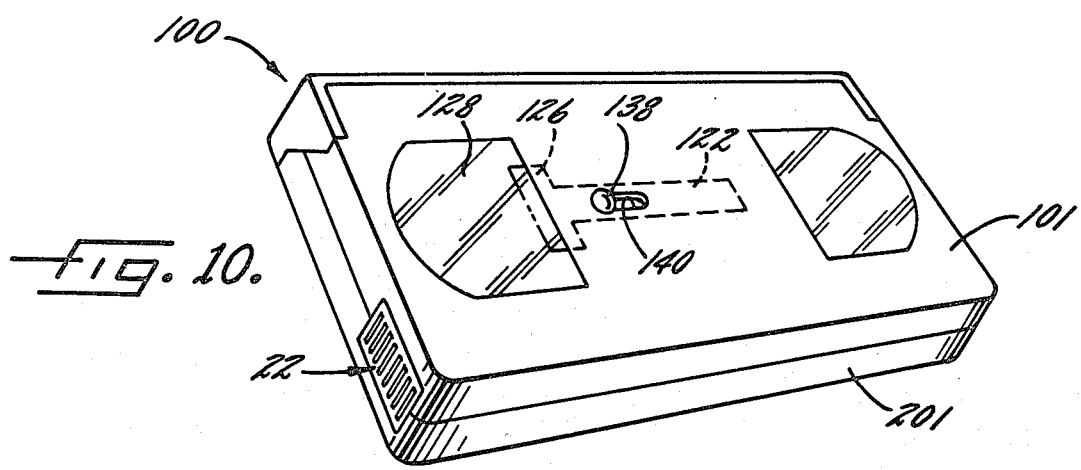
FIG. 10 is a perspective view of a video cassette having electronic memory means constructed in accordance with this invention.

As seen in FIG. 9, a flat part 78 on the shaft 70, which fits against a flat portion 85 of the over-sized hole 86 in the pawl 68, maintains the pawl under the spring tension of the spring 74 in a position perpendicular with respect to the lever 64 under normal conditions.

Furthermore, a second spring 87 resting against the inside edge of the housing 16 of the cassette acts upon the lever 64 in such a way as to urge the later constantly in the direction of the cassette reels.

In keeping with the invention, the signal device carried by the cassette 12 is activated from its first "no-error" state to a second "error" state upon operation of the cassette reels when received in a peripheral device, such as a tape deck apparatus, having no means for communicating with cassette memory. Furthermore, when received in apparatus equipped to communicate with cassette memory, the signal device may be blocked from generating the warning signal and left in its first state by means on such apparatus herein shown as a rod 88 which, on introduction of the cassette 12 into the tape deck apparatus, enters an oval opening 89 in the cassette 12 and which is located on its median axis. Thus, the rod engages the lever 64 and blocks clockwise movement of the lever from the position shown in FIG. 5 and holds it in this position. With this arrangement, the pawl 68 is held clear of notches 90 in the reel.

Figure 6:
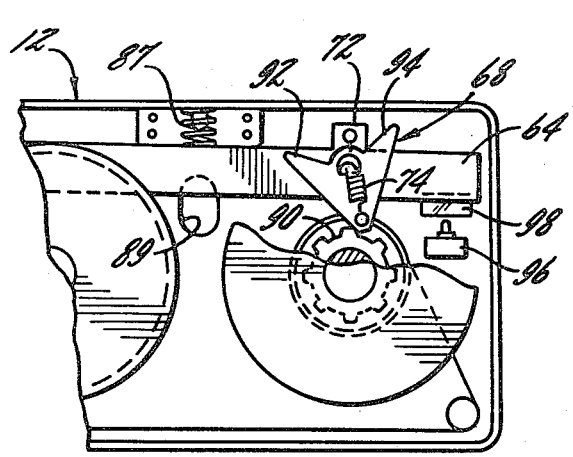
FIGS. 6–8 are fragmentary plan views illustrating the mechanism shown in FIG. 5 in different operating positions.
Figure 7:
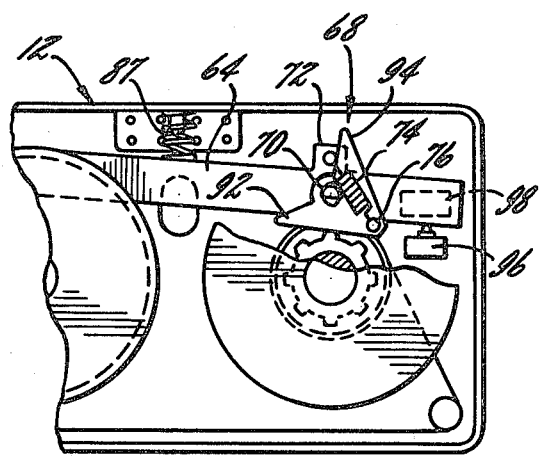

When a cassette according to this invention is introduced into a tape deck apparatus not adapted to receive such a cassette and not containing a blocking rod 88, as the cassette is operated the rotation of the reels and the notches 90 in the reel will cause the pawl 68 to rotate into the position of FIG. 6, while the spring 74 will act in turn to cause the pawl to rock until the inside surface of one of the flanks 92, 94 of the pawl comes into contact with the projection 72 of the lever 64 (FIG. 7) and acts upon the same; because of this the lever 64 is brought into the position of FIG. 7 where it actuates a microswitch 96. Preferably the switch 96, which like the signal device is a two state device representing that information stored in the memory means has no error or has an error, respectively, is connected to the memory means so as to erase the data representing tape position stored in the dedicated memory locations at addresses 80 and 81 of the memory associated with the cassette and/or the switch 96 may be connected via the terminals of the memory means to controller means of a peripheral device for warning the user that memory stored data may be in error, as by flashing a display, or utilized in the controller means to initiate a function such as correcting the memory. Thus, the state of the signal device may be monitored by the controller means of a peripheral device, such as a tape deck apparatus.

Moreover, as shown in FIGS. 6 and 7 the end of the lever 64 is situated in front of a window 98 of the cassette 12, thus set in its second "error" state visually signalling to the user that the cassette has been introduced into a tape deck apparatus not suited for a cassette according to the invention. To warn the user, the end of this lever will preferably be colored, for example, in red.

Figure 8:
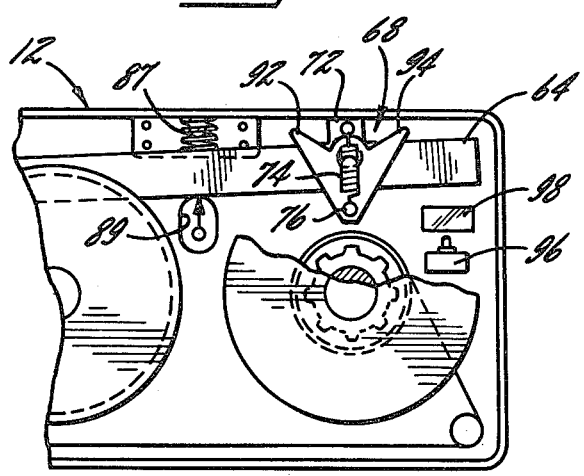

When the cassette is to be re-used in a tape deck apparatus adapted to receive such a cassette it is sufficient to introduce a pointed object (as indicated in FIG. 8) into the slot 89 in order to bring the lever 64 into the position of FIG. 8 and the pawl returned into the initial perpendicular position on the lever.

Furthermore, as shown in FIGS. 6 and 7, the lever 64 is also opposite the opening 89 which prevents the introduction of the rod 88 of the tape deck apparatus and interferes with introducing the cassette completely into its normally operating position. Thus the user is warned that it is necessary to realign the lever 64 to its initial position and prepare the cassette for use in tape deck apparatus adapted to receive it.

Figure 11A:
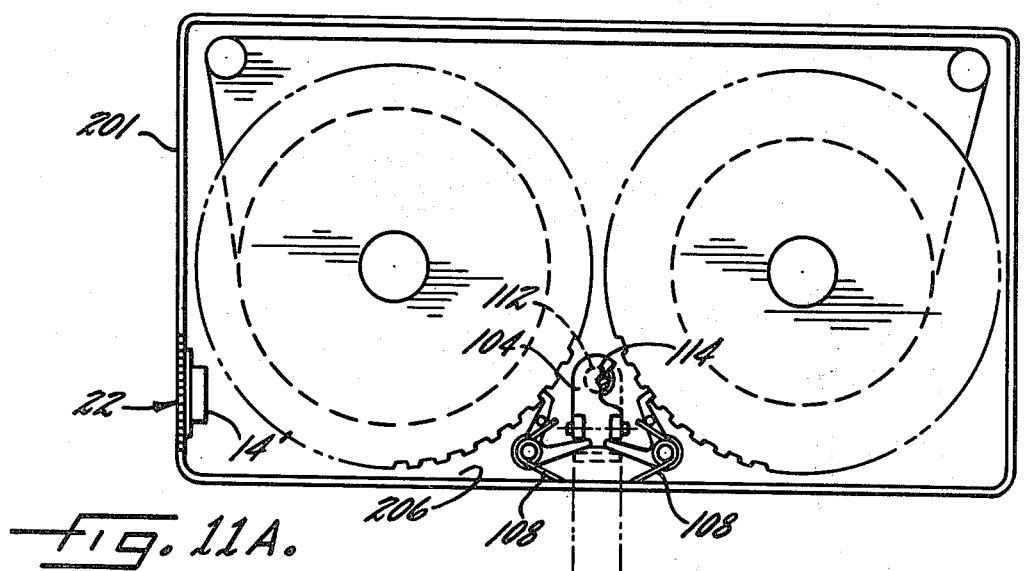
FIGS. 11 and 11A are plan views with parts broken away showing details of a mechanism included in the cassette of FIG. 10 for generating signals warning the user after cassette with memory is operated in tape deck apparatus not adapted for such a cassette.
Figure 11:
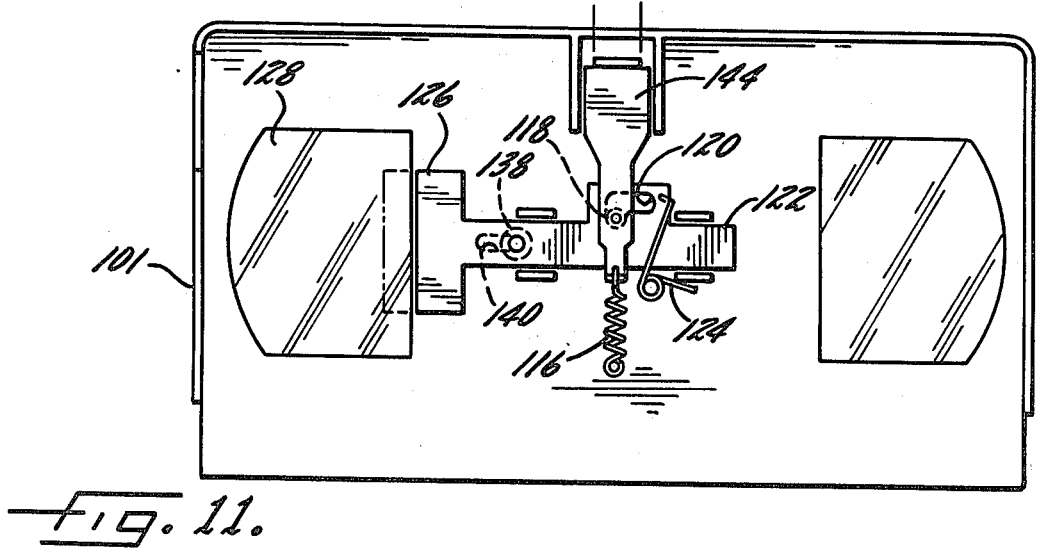
Figure 12:
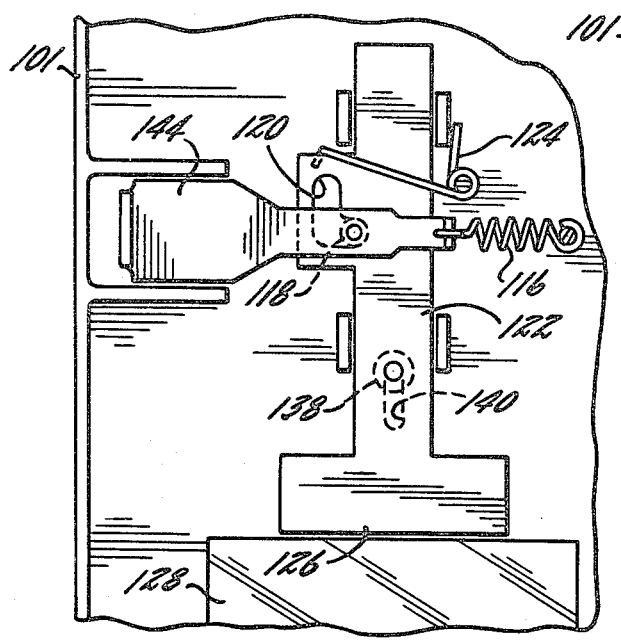
FIGS. 12 and 12A are fragmentary views showing the mechanism in a different position.
Figure 12A:
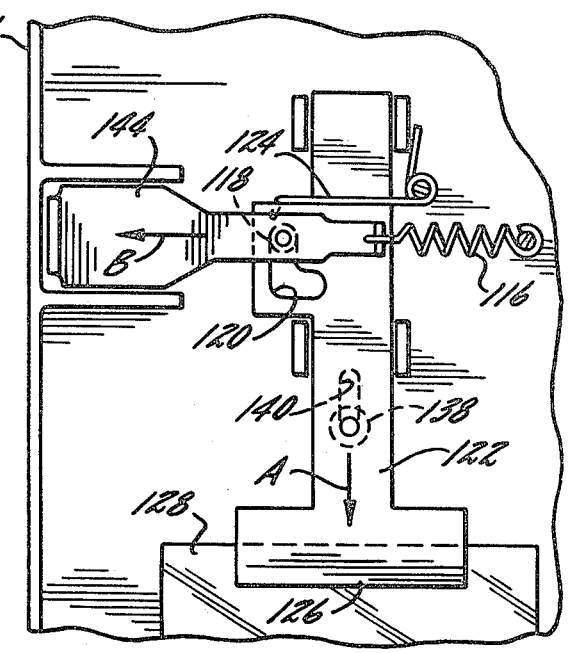

Now turning to FIGS. 10-15 a mechanism for signalling the user that cassette memory 14' contains incorrect data regarding tape position, is shown in these figures applied to a video cassette. A conventional video cassette 100 is shown, and includes a housing made of two half sections; the upper half 101 of the housing is illustrated in FIG. 11, while the inside of the lower half of the housing is shown in FIG. 11A.

Conventional video cassettes incorporate an L-shaped lever 104 (FIG. 15) which is pivotally mounted within a cavity 206 in the lower half 201 of the cassette housing, which is acted on by springs 108 tending to rotate the lever 104 clockwise. This lever 104 is provided for locking both cassette reels when the cassette is inoperative, in order to avoid tape movement. When the cassette 100 is introduced into tape deck apparatus, as shown in FIG. 13 it is lowered onto the main frame 110 of the apparatus and a pin 112 carried by the main frame 110 enters the cassette 100 through an aperture 114, the effect of the pin 112 being to rotate the lever 104 and unlock both cassette reels in order to allow tape movement.

Figure 13:
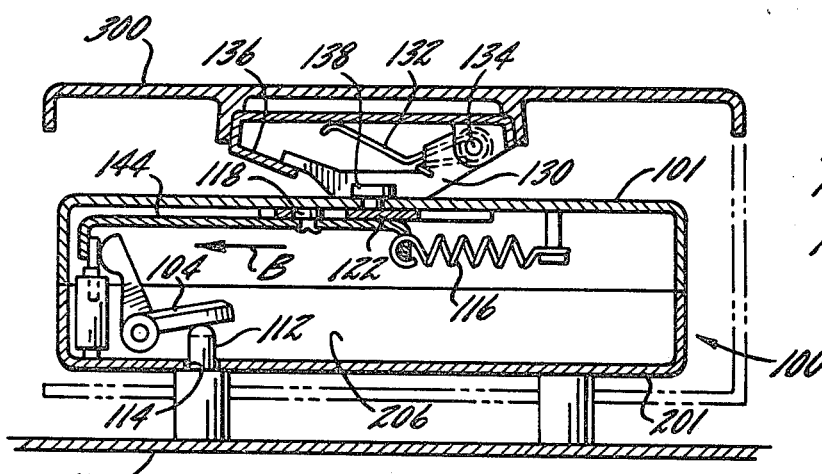
FIG. 13 is a fragmentary cross-sectional view of a tape deck apparatus and cassette of the type shown in FIGS. 10–12.

In carrying out the present aspect of the invention, to provide means for the generation of memory error signals such conventional video cassettes 100 are further provided with a rod 144 slidably supported on the cassette housing which is engaged by the lever 104 and translated in the direction indicated by the arrow B in FIG. 13 against the force of a spring 116 anchored to the cassette housing when the lever 104 is rotated by the pin 112. Simultaneously a pin 118, carried by the rod 144 slides along the base of an L-shaped slot 120 in a signal plate 122 also supported in the cassette housing, to the corner of the slot, thus releasing the signal plate 122 for translation by an associated resilient means 124 in a cross-direction (indicated by arrow A) relative to the movement of the rod 144. The release of the signal plate 122 and its movement in the direction of the arrow A to the position shown in FIG. 12 generates a signal by shifting a red section 126 on the plate 122 in registry with the window 128 located in the upper half 101 of the cassette housing.

It is contemplated that this red section 126 on the signal plate 122 is for the purpose of warning the user that a cassette incorporating memory means 14' according to this invention, has been introduced into a conventional tape deck apparatus not equipped to operate with cassette memory.

Figure 14:
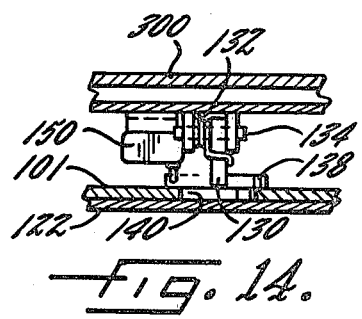
FIG. 14 is a cross-sectional view of a portion of the mechanism taken from the left in FIG. 13.
Figure 15:
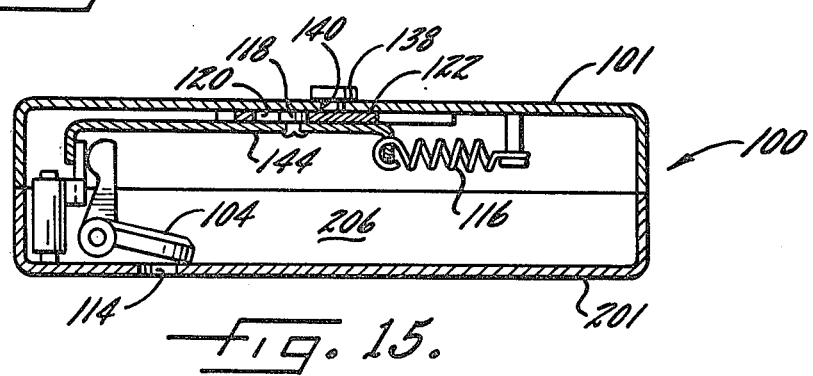
FIG. 15 is a cross-sectional view of the cassette.

On tape deck apparatus equipped with means for communicating with memory means 14' of the video cassette 100 loaded in the apparatus, means are provided for blocking the generation of the signal by preventing the red warning flag 126 from being positioned in the window 128 of the cassette housing. For this purpose, the tape deck apparatus is provided, as shown in FIG. 13, with a lever 130 which is mounted on the housing 300 for receiving the cassette in its operative position so as to be positioned over a cassette when the latter is introduced into the apparatus. Resilient means 132 are also included tending to rotate the lever 130 counter-clockwise around its axle 134. The end of the lever 130 rests, under the urging of its resilient means 132, against a finger 136 which is an integral part of the housing 300. The lever 130 is located by its resilient means in a position to block translation in the direction of the arrow A, of the signal plate 122 due to interference between a pointer 138 which is carried by the plate, and the lever 130. FIG. 14 illustrates the pointer 138 abutting the bottom edge of the lever 130 where it lies immediately adjacent the outside surface of the upper half 101 of the cassette 100. The pointer 138 is thus blocked from movement from its inoperative position in a rectangular slot 140 in the cassette. Thus when the cassette is removed from the apparatus, the pointer 138 remains in the inoperative position and indicates that the tape position (side 1 and 2) is correctly stored in memory means carried by the cassette housing. But if a cassette with memory means is used on a conventional tape deck which is not equipped for driving said memory means and thus does not include such a lever 130, the pointer will not be blocked from moving towards its operative position. Said pointer will indicate that the tape position (side 1 and 2) may not be correctly stored in memory means carried by the cassette housing since the tape has been operated but the memory not operated by any operating device in the tape deck apparatus. The contents of the other memory locations being still correct, the user will just have to rewind the tape to its beginning and reset the counter to zero of the tape deck apparatus, when a cassette is introduced into and used in an apparatus adapted for operating with cassette memory.

The pointer 138 may actuate a switch 150 (FIG. 14) located on the main frame of the apparatus so as to drive an electrical warning (such as display flashing in an indication that the memory is not accurate) when a cassette having an incorrect memory by reason of having been used in apparatus not adapted for updating the memory of tape position, is inserted in an apparatus equipped for operating with such a cassette memory.

I claim:

1. In combination with a cassette containing a magnetic recording tape, said cassette having a housing and one or more reels for said tape within said housing, electronic memory means carried by said housing having terminals adapted to engage and establish electrical connection to terminals of a peripheral device, said memory means including semi-conductor memory circuits for representing by the state of said circuits, information as to the cassette or tape contained therein and readable from said peripheral device via said terminals.

2. The combination set forth in claim 1 wherein said memory circuits provide means for storing signals received from said peripheral device via said terminals.

3. In combination with a cassette containing a magnetic recording tape, said cassette having a housing and one or more reels for said tape within said housing, said housing having a wall, electronic memory means carried by said housing including semi-conductor memory circuits mounted on said wall inside said housing, and a set of conductive bars mounted on said wall outside said housing connected to said memory circuits and providing terminals adapted to engage and establish electrical connection to terminals of a peripheral device, said memory circuits providing static memory for signals representing information as to the cassette or tape contained therein and readable from said peripheral device via said terminals.

4. In combination,
cassettes of magnetic recording tape, each said cassette having a housing and one or more reels for said tape within said housing, electronic memory means carried by said housing for storing signals representing information as to the cassette or tape contained therein, terminals on the outside of said housing connected to said memory means, and
tape deck apparatus for said cassettes including a tape drive and controller means for operating said tape drive, terminals included in said apparatus connected to said controller means and adapted to be engaged by said terminals on the housings of said cassettes when a cassette is introduced into said tape deck apparatus, to enable said controller means to read signals stored in the memory means of a cassette in said apparatus.

5. The combination set forth in claim 4, said tape deck apparatus including means for generating signals responsive to tape movement and said controller means including means for producing signals representing instantaneous tape position derived from said signals generated responsive to tape movement;
means included in said controller means and said memory means of a cassette operative in cooperation to write said tape position signals in said memory means, said controller means and said memory means also including means operative to read tape position signals written in said memory means.

6. In combination,
cassettes of magnetic recording tape, each said cassette having a housing and electronic memory means carried by said housing for storing signals representing data as to the cassette or tape contained therein,
a peripheral device into which a cassette may be introduced and removed, said device including a display,
means on the housing of each cassette connected to the memory means carried thereby cooperating with means on said peripheral device for transmitting signals read from the memory means and for displaying information represented thereby on said display.

7. In a tape deck apparatus for cassettes of magnetic recording tape, in which a cassette may be introduced and removed, said cassette having memory means including semi-conductor memory circuits for storing signals representing data as to the cassette or tape contained therein, said apparatus including a tape drive, controller means for operating said drive, generating means for producing signals representing tape movement by said drive, display means operated by said controller means to display instantaneous tape position derived from said signals, means connecting said memory means, when said cassette is received in said apparatus, with said controller means, means included in said controller means for reading data from and writing data to said memory means, a device operable manually to provide input data to said controller means for writing into said memory means, and means connecting said controller means to said display means to display data read from said memory means.

8. in combination:

a cassette of recording tape;

said cassette having electronic memory circuits for storing data relating to the cassette or the tape contained in the cassette, tape drive means, controller means for said tape drive means, generating means for producing signals representing tape movement by said drive means, display means operated by said controller means to display instantaneous tape position derived from said signals, means for connecting said controller means to said electronic memory circuits of a cassette received on said tape drive means, said controller means including circuit means operative to write data signals in said memory circuits representing instantaneous tape position derived from signals produced by said generating means, said controller means including circuit means operative to read said memory circuits and provide instantaneous tape position data.

9. A cassette of recording tape, said cassette including a housing, reel means in said housing for storing tape, an electronic memory including semi-conductor circuits in said housing, said cassette further including a memory signal device in said housing for generating a signal upon operation thereof by mechanism associated with said cassette reel means, said signal representing that data stored in said cassette memory may be in error, and means carried by said cassette housing for cooperation with means on a peripheral device for blocking the generation of said error signal.

10. The combination set forth in claim 9 wherein said memory error signal device generates a visual signal.

11. The combination set forth in claim 9 wherein said memory error signal device generates an electrical signal.

12. The combination set forth in claim 9 wherein said memory error signal device comprises a pivotably mounted lever carrying a pawl, a toothed disc rotatable with one of said cassette reels and engageable to rock said pawl and thereby pivot the lever to a position to generate a signal, and said means for blocking the generation of said signal includes an opening in said cassette housing positioned to receive an element on a peripheral device for blocking the pivotal movement of the lever.

13. The combination set forth in claim 12 wherein said lever provides a visual signal in said position, to warn the user.

14. The combination set forth in claim 12 wherein said signal device includes a switch carried by the cassette housing and connected to said memory means, and said lever acts on said switch in said position to provide an electrical signal.

15. The combination set forth in claim 9 wherein said cassette is a video cassette and said memory error signal device includes a plate movably mounted in said cassette for movement to a signal position upon operation of mechanism included in said video cassette to unlock the reels.

16. The combination set forth in claim 9 wherein said cassette is a two-reel cassette with magnetic recording tape, and said memory error signal device includes a lever movably mounted in said cassette for movement to a signal position upon rotation of one of said reels.

17. The combination set forth in claim 9 wherein said device for generating a signal includes a switch activated upon operation of one of said cassette reels and connected to said memory means.

18. The combination set forth in claim 17 including means for erasing tape position data from said electronic memory means responsive to actuation of said switch.

19. The combination set forth in claim 2 wherein said memory circuits include blocks of electrically alterable circuits for storage of signals received from a peripheral device.

20. A cassette of recording tape, said cassette including a housing, reel means in said housing for storing tape, an electronic memory including semi-conductor circuits in said housing for storing data relating to said cassette or the tape therein, said cassette further including a memory error signal device in said housing having two states representing that data stored in said cassette memory has no error or has an error, respectively, and means in said cassette housing operable by a peripheral device to set said signal device from said no error to said error representing state.

21. A cassette of recording tape according to claim 20, wherein said signal device, provides an error signal when set in said error representing state.

22. A cassette of recording tape according to claim 21.

including means connecting said signal device to operate a peripheral device to indicate the state of said signal device.

23. A cassette of recording tape according to claim 20, wherein said memory error signal device generates an electrical signal when set in said error representing state.

24. A cassette of recording tape according to claim 22 wherein said memory error signal device comprises a pivotably mounted lever carrying a pawl, a toothed disc rotatable with said reel means and engageable to rock said pawl and thereby pivot and set the lever to an error representing state to generate a signal, and said means for blocking the generation of said signal includes an opening in said cassette housing positioned to receive an element on a peripheral device for blocking the pivotal movement of said lever.

25. A cassette of recording tape according to claim 24, wherein said lever provides a visual signal when set in said error representing state, to warn the user.

26. A cassette of recording tape according to claim 25, wherein said error signal device includes a switch carried by the cassette housing and connected to said memory means, and said lever acts on said switch when set in said error representing state to provide an electrical signal.

27. A cassette of recording tape according to claim 20 wherein said cassette is a video cassette and said memory error signal device includes a plate movably mounted in said cassette for movement to an error representing state, and a mechanism included in said video cassette to unlock said reel means and operable to set said plate in said error representing state.

28. A cassette of recording tape according to claim 20 wherein said reel means includes two reels with magnetic recording tape, and said memory error signal device includes a lever movably mounted in said cassette and adapted to be set in error representing state upon rotation of one of said reels.

29. A cassette of recording tape according to claim 20 wherein said memory error signal device includes a switch actuated upon operation of said reel means and connected to said memory means.

30. A cassette of recording tape according to claim 29 including means for erasing tape position data from said electronic memory means responsive to actuation of said switch.

31. The combination set forth in claim 1 further comprising a memory error signal device in said cassette housing having two states representing that information stored in said cassette memory circuits has no error or has an error, respectively.

32. The combination set forth in claim 31 further comprising means included in said peripheral device for monitoring the state of said memory error signal device.

* * * * *